United States Patent [19]
Haskell et al.

[11] Patent Number: 6,005,622
[45] Date of Patent: Dec. 21, 1999

[54] VIDEO CODER PROVIDING IMPLICIT OR EXPLICIT PREDICTION FOR IMAGE CODING AND INTRA CODING OF VIDEO

[75] Inventors: Barin Geoffry Haskell, Tinton Falls, N.J.; Atul Puri, Riverdale, N.Y.; Robert Louis Schmidt, Howell, N.J.

[73] Assignee: AT&T Corp, New York, N.Y.

[21] Appl. No.: 08/908,043

[22] Filed: Aug. 11, 1997

Related U.S. Application Data

[60] Provisional application No. 60/026,963, Sep. 20, 1996, and provisional application No. 60/038,019, Feb. 14, 1997.

[51] Int. Cl.[6] .................................................. H04N 7/50
[52] U.S. Cl. ........................ 348/400; 348/397; 348/420; 348/437; 348/438
[58] Field of Search .................................... 348/400–407, 348/409–413, 415–416, 419–420, 699, 397, 398, 437, 438; 382/238, 248; 386/109; 375/244; H04N 7/30, 7/32, 7/50

[56] References Cited

U.S. PATENT DOCUMENTS

| | | | |
|---|---|---|---|
| 4,245,248 | 1/1981 | Netravali et al. | 348/413 |
| 4,717,956 | 1/1988 | Moorhead et al. | 348/407 |
| 5,001,559 | 3/1991 | Gonzales et al. | 348/400 |
| 5,116,287 | 5/1992 | Koike et al. | 348/400 |
| 5,473,376 | 12/1995 | Auyeung | 348/403 |
| 5,561,477 | 10/1996 | Polit | 348/700 |
| 5,600,375 | 2/1997 | Wickstrom | 348/400 |
| 5,737,022 | 4/1998 | Yamaguchi et al. | 348/416 |
| 5,764,296 | 6/1998 | Shin | 348/405 |
| 5,764,374 | 6/1998 | Seroussi et al. | 358/427 |
| 5,812,197 | 9/1998 | Chan et al. | 348/416 |

OTHER PUBLICATIONS

"Intra Prediction (T9/T10) and DC/Ac Prediction Results"; International Organisation for Standardisation Coding of Moving Pictures and Associated Audio Information ISO/IEC JTC1/SC29/WG11 MPEG96/0939 Jul. 1996.

"Altered Sections of H.263 for Draft Test of H.263+"; ITU—Telecommunications Standardization SectorDocument: ITU–LBC–96–358R1 Study Group 15.

International Organization for Standardisation; Generic Coding of Moving Pictures and Associated Audio Information: Video; Recommendation H.262; ISO/IEC 13818–2 JTC1/SC29/WG11 N0702(revised) Incorporationg N702 Delta of Mar. 24 and Further Editorial Corrections May 10, 1994.

International Organization for Standardisation; MPEG–4 Video Verification Model Vesion 2.1; ISO/IEC JTC1/SC29/WG11 XXXX of May 3, 1996.

International Organization for Standardisation; Working Draft 4.0 of ISO/IEC 14496–2; ISO/IEC JTC1/SC29/WG11 N1797; MPEG97/Stockholm, Jul. 1997.

*Primary Examiner*—Vu Le

[57] ABSTRACT

A predictive video coder performs gradient prediction based on previous blocks of image data. For a new block of image data, the prediction determines a horizontal gradient and a vertical gradient from a block diagonally above the new block (vertically above a previous horizontally adjacent block). Based on these gradients, the encoder predicts image information based on image information of either the horizontally adjacent block or a block vertically adjacent to the new block. The encoder determines a residual that is transmitted in an output bitstream. The decoder performs the identical gradient prediction and predicts image information without need for overhead information. The decoder computes the actual information based on the predicted information and the residual from the bitstream.

20 Claims, 7 Drawing Sheets

VIDEO CODER PROVIDING IMPLICIT OR EXPLICIT PREDICTION FOR IMAGE CODING AND INTRA CODING OF VIDEO

RELATED APPLICATIONS

This application claims the benefit of priority afforded by provisional application No. 60/026,963, filed Sep. 20, 1996, and provisional application No. 60/038,019 filed Feb. 14, 1997.

BACKGROUND OF THE INVENTION

A variety of protocols for communication, storage and retrieval of video images are known. Invariably, the protocols are developed with a particular emphasis on reducing signal bandwidth. With a reduction of signal bandwidth, storage devices are able to store more images and communications systems can send more images at a given communication rate. Reduction in signal bandwidth increases the overall capacity of the system using the signal.

However, bandwidth reduction may be associated with particular disadvantages. For instance, certain known coding systems are lossy, they introduce errors which may affect the perceptual quality of the decoded image. Others may achieve significant bandwidth reduction for certain types of images but may not achieve any bandwidth reduction for others. Accordingly, the selection of coding schemes must be carefully considered.

Accordingly, there is a need in the art for an image coding scheme that reduces signal bandwidth without introducing perceptually significant errors.

SUMMARY OF THE INVENTION

The disadvantages of the prior art are alleviated to a great extent by a predictive coding scheme in which a new block of image data is predicted from three blocks of image data that preceded the new block. For this new block, an encoder examines image data of blocks that are horizontally and vertically adjacent to the new block. The encoder compares the image data of each of the two adjacent blocks to image data of a third block positioned horizontally adjacent to the vertically adjacent block (diagonally above the new block). From these comparisons, a horizontal and a vertical gradient is determined. Based on the values of the gradients, the encoder predicts the image data of the new block to be the image data of the horizontally or vertically adjacent block most similar to it. The encoder then determines a residual difference between the predicted value of the image data and the actual value of the image data for the new block and encodes the residual. A decoder performs an inverse prediction, predicting image data for the new block based upon horizontal and vertical gradients and adding the residual thereto to reconstruct the actual image data of the new block. This process is lossless.

The implicit video encoder of the present invention is particularly suited to code highly textured images. In flat areas, the performance advantages are more modest. Other video coding schemes, such as those employing explicit coding, may be more efficient when coding these flat image areas. Accordingly, the present invention includes an embodiment wherein an encoder may select among the implicit coder of the present invention and other coding schemes to achieve the highest coding efficiency possible.

DETAILED DESCRIPTION

Figure 1A:
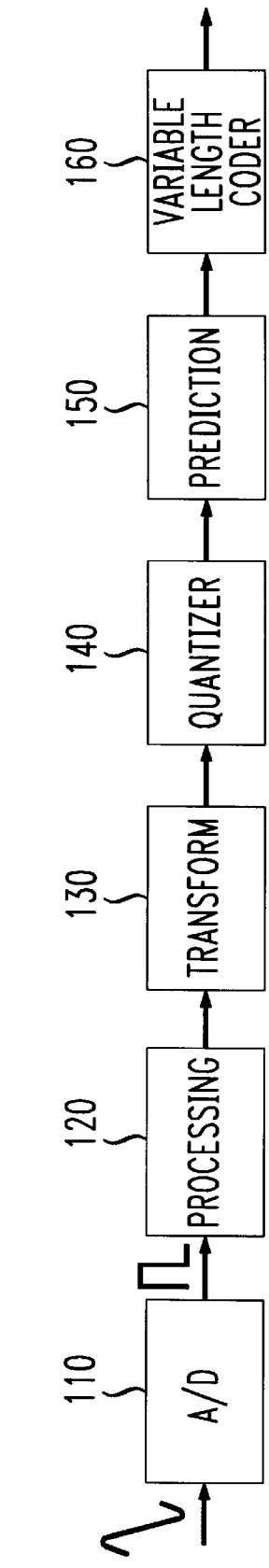
FIG. 1(a) is a schematic drawing of an encoder in accordance with an embodiment of the present invention.

FIG. 1(a) shows an encoder 100 constructed in accordance with a first embodiment of the present invention. An analog image signal is presented to the encoder 100. The image signal is sampled and converted to a digital signal by an analog to digital ("A/D") converter 110 using techniques known in the art. The A/D converter 110 generates a digital image signal for a plurality of pixels of the image. Alternatively, the image signal may be presented to the encoder as a digital image signal; in this case, the A/D converter 110 is omitted.

The digital image signal is input to a processing circuit 120. The processing circuit 120 may perform a host of functions. Typically, the processing circuit 120 filters the image data and breaks the image data into a luminance signal component and two chrominance signal components. Additionally, the processing circuit 120 groups image data into blocks of data. Where the digital input signal represents information for a plurality of pixels in a scanning direction, the digital output of the processing circuit 120 represents blocks of pixels, for example, data may be blocked into 8 pixel by 8 pixel arrays of image data. The processing circuit 120 outputs image data on a macroblock basis. A macroblock typically consists of four blocks of luminance data and two blocks of chrominance data. The processing circuit 120 may also perform additional functions, such as filtering, to suit individual design criteria.

The output of the processing circuit 120 is input to a transform circuit 130. The transform circuit 130 performs a transformation of the image data, such as discrete cosine transform ("DCT") coding or sub-band coding, from the pixel domain to a domain of coefficients. A block of pixels is transformed to an equivalently sized block of coefficients. Coefficients output by DCT coding generally include a single DC coefficient; the remainder are AC coefficients, some of which are non-zero. Similarly, coefficients output by sub-band coding represent image characteristics at a variety of frequencies; typically, many coefficients from sub-band coding are very small. The transform circuit 130 outputs blocks of coefficients.

A quantizer 140 scales the signals generated by the transform circuit 130 according to a constant or variable scalar value ($Q_p$). The quantizer 140 reduces bandwidth of the image signal by reducing a number of quantization levels available for encoding the signal. The quantization process is lossy. Many small coefficients input to the quantizer 140 are divided down and truncated to zero. The scaled signal is output from the quantizer 140.

The prediction circuit 150 performs gradient prediction analysis to predict scaled DC coefficients of each block. The prediction circuit 150 may pass scaled AC coefficients or, alternatively, may predict AC coefficients of the block. In a preferred mode of operation, the prediction circuit 150 selects between modes of predicting or passing AC coefficients; in this case, the prediction circuit 150 generates an AC prediction flag to identify a mode of operation. The prediction circuit 150 outputs a DC residual signal, AC signals (representing either AC coefficients or AC residuals) and an AC prediction flag.

A variable length coder 160 encodes the output of the prediction circuit 150. The variable length coder 160 typically is a Huffman encoder that performs run length coding on the scaled signals. A bitstream output from the variable length coder 160 may be transmitted, stored, or put to other uses as are known in the art.

Figure 1B:
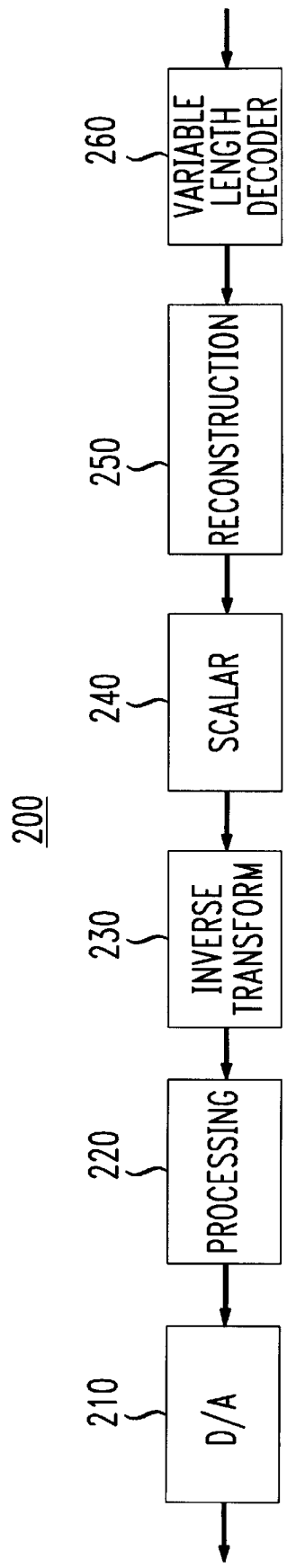
FIG. 1(b) is a schematic drawing of a decoder in accordance with an embodiment of the present invention.

In the encoder 100, the prediction circuit 150 and the quantizer 140 perform functions which are mutually independent. Accordingly, their order of operation is largely immaterial. Although FIG. 1 illustrates output of the quantizer 140 as an input to the prediction circuit 150, the circuits may be reversed in order. The output of the prediction circuit 150 may be input to the quantizer 140.

A decoder 200, shown in FIG. 1(*b*), performs operations that undo the encoding operation described above. A variable length decoder 260 analyzes the bitstream using a complementary process to recover a scaled signal. If a Huffman encoder were used by the encoder 160, a Huffman decoder 260 is used.

A reconstruction circuit 250 performs the identical gradient analysis performed in the prediction circuit 150. The DC residual signal is identified and added to a predicted coefficient to obtain a DC coefficient. Optionally, the reconstruction circuit 250 may identify the AC prediction flag and, on the status of that flag, interprets the AC information as either AC coefficient information or AC residual information. In the event that AC residual information is present, the reconstruction circuit 250 adds the residual signals to corresponding predicted signals to obtain AC coefficients. The reconstruction circuit 250 outputs coefficient signals.

A scalar circuit 240 multiplies the recovered signal by the same scalar used as a basis for division in the quantizer 140. Of course, those coefficients divided down to zero are not recovered.

An inverse transformation circuit 230 performs the inverse transformation applied by the transform circuit 130 of encoder 100. If a DCT transformation were performed, an inverse DCT transformation is applied. So, too, with subband coding. The inverse transformation circuit 230 transforms the coefficient information back to the pixel domain.

A processing circuit 220 combines luminance and chrominance signals and may perform such optional features as are desired in particular application. The processing circuit 220 outputs digital signals of pixels ready to be displayed. At this point the signals are fit for display on a digital monitor. If necessary to fit a particular application, the signals may be converted by a digital to analog converter 210 for display on an analog display.

Figure 2:
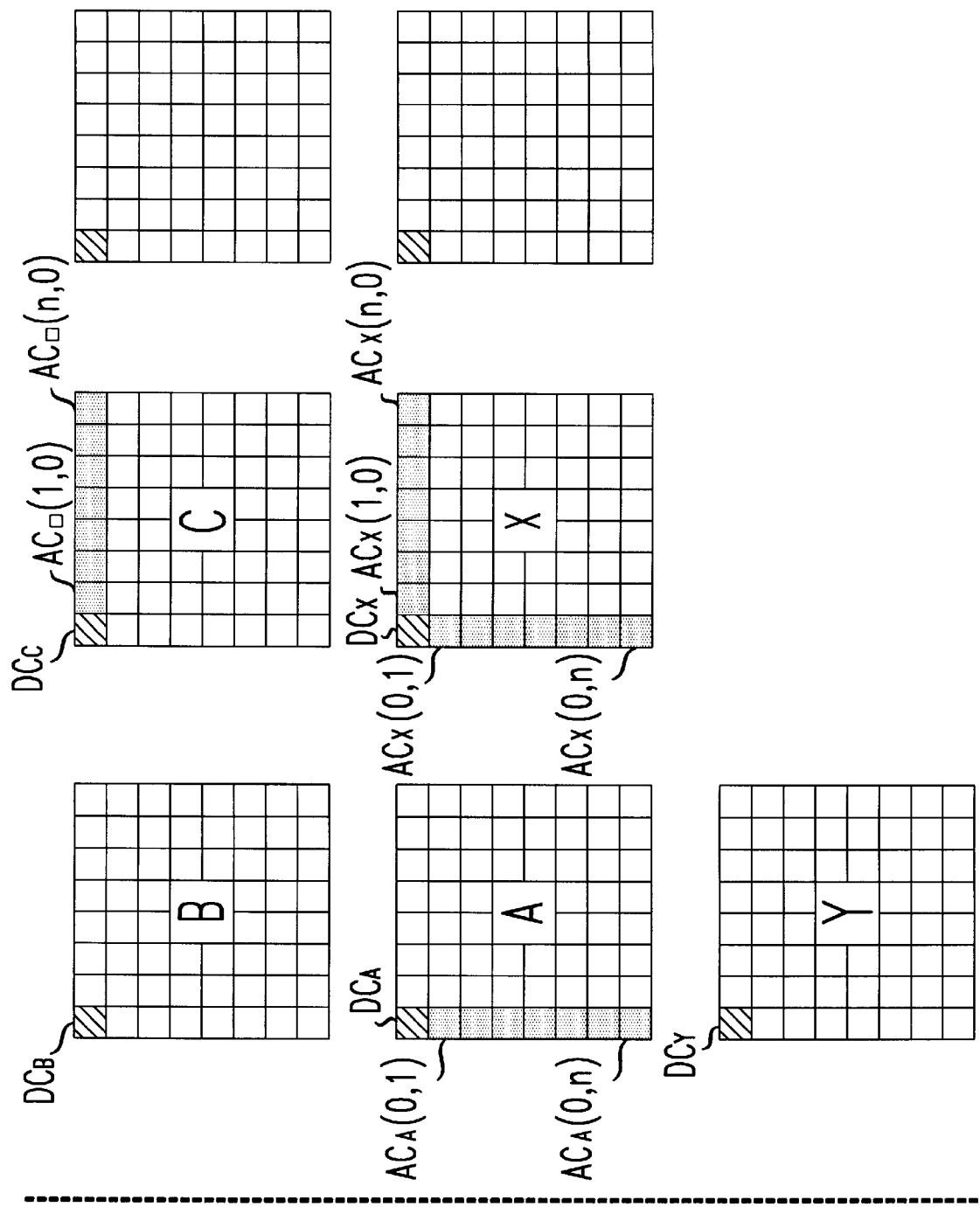
FIG. 2 illustrates an example of image data processed by the present invention.

FIG. 2 illustrates the structure of data as it is processed by the prediction circuit. The data output from the transform circuit represents a plurality of blocks organized into macroblocks. Each macroblock is populated typically by four blocks representing luminance components of the macroblock and two blocks representing chrominance components of the macroblock.

Each block represents coefficients of the spatial area from which the block was derived. When a DCT transform is applied, a DC coefficient of $DC_X$ of the block is provided at the origin of the block, at the upper left corner. AC coefficients are provided throughout the block with the most significant coefficients being provided horizontally on the row occupied by the DC coefficient and vertically on a column occupied by the DC coefficient.

Figure 3:
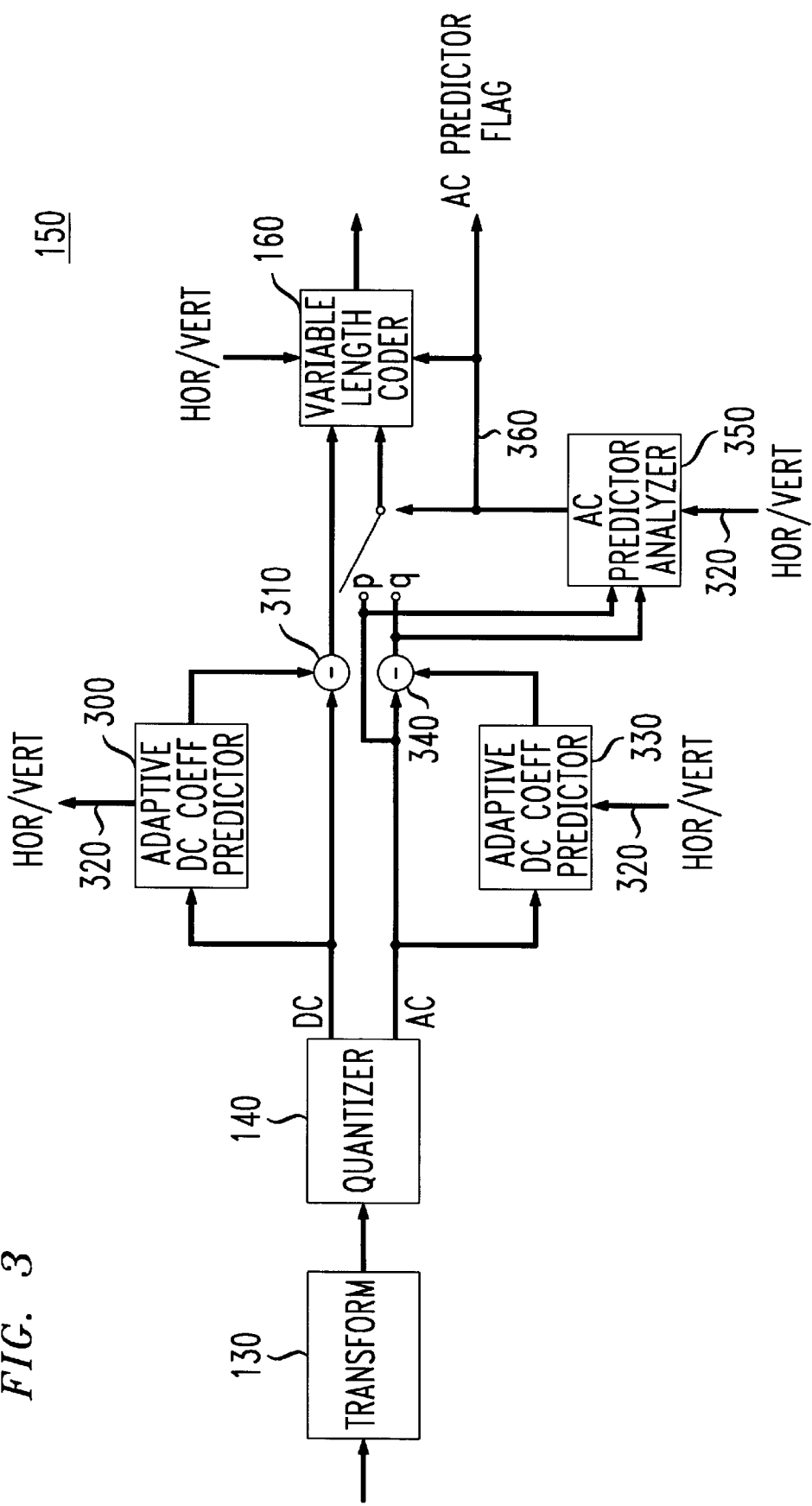
FIG. 3 is a block diagram of the prediction circuit of FIG. 1.

FIG. 3 shows a detailed block diagram of the prediction circuit 150. The quantizer 140 generates scaled DC and AC coefficients. The DC coefficient may be scaled (DC=DC/$Q_p$, typically $Q_p$=8) and is input to a DC coefficient predictor 300. The DC coefficient predictor performs a gradient analysis.

For any block X, the DC coefficient predictor 300 maintains in memory data of a block A horizontally adjacent to block X, block C vertically adjacent to block X and a block B, that is, a block horizontally adjacent to block C and vertically adjacent to block A, shown in FIG. 2. The DC coefficient predictor compares a DC coefficient of block A ($DC_A$) with a DC coefficient of block B ($DC_B$). The difference between the DC coefficients of block A and block B is a vertical gradient. The DC coefficient predictor 300 also compares a DC coefficient of block C ($DC_C$) with the DC coefficient of block B ($DC_B$). The difference between the coefficients of block C and block B is a horizontal gradient.

The block associated with the highest gradient from block B is used as a basis of prediction. If the vertical gradient is greater than the horizontal gradient, it is expected that block A will have high correlation with block X, so the DC coefficient predictor 300 employs horizontal prediction in which it uses block A as a basis for prediction of block X. If the horizontal gradient is greater than the vertical gradient, so the DC coefficient predictor 300 employs vertical prediction in which it uses block C as a basis for prediction of block X. The DC coefficient predictor 300 outputs the DC coefficient of the block used for prediction ($DC_A$ or $DC_C$) to a subtractor 310. The DC coefficient predictor 300 also generates a hor/vert signal 320 indicating whether horizontal prediction or vertical prediction is performed.

The subtractor 310 subtracts the DC coefficient generated by the DC coefficient predictor 300 from the DC coefficient of block X to obtain a DC residual signal for block X. The DC residual may be output from the prediction circuit 150 to the variable length encoder 160.

The process described above is employed to predict coefficients of blocks at the interior of the image to be coded. However, when predicting coefficients at the start of a new row of a video object plane, the previous block for prediction is the last block of the line above under the normal process. Typically, there is little correlation between these blocks.

Assume that block Y in FIG. 2 is at the starting edge of a video object plane. No block is horizontally adjacent to block Y in the scanning direction. Although, image data of a final block in the row above is available to be used as the "horizontally adjacent" block, it is not used for prediction. Instead, the DC coefficient predictor 300 artificially sets the DC coefficient values for a horizontally adjacent block and a block above the horizontally adjacent block to a half strength signal. If the DC coefficients are represented by an 8 bit word, the DC coefficient of these ghost blocks is set to 128. The DC coefficient predictor 300 then performs gradient prediction according to the process described above.

As noted above, the prediction circuit 150 may pass AC coefficients without prediction. However, in a preferred embodiment, the prediction circuit 150 uses the gradient analysis to predict AC coefficients.

When the prediction circuit 150 predicts AC coefficients, only some of the AC coefficients may exhibit high correlation between blocks. In the case of DCT transform coding and horizontal prediction, the only AC coefficients that are likely to exhibit sufficiently high correlation to merit prediction analysis are those in the same column as the DC coefficient (shaded in block A). Accordingly, for each AC coefficient of block X in the same column as the DC coefficient ($AC_X(0,1)$ to $AC_X(0,n)$), an AC coefficient predictor 330 generates a prediction corresponding to the colocated AC coefficient from block A ($AC_A(0,1)$ to $AC_A(0,n)$). The predicted AC coefficient is subtracted from the actual AC coefficient of block X at a subtractor 340 to obtain an AC prediction residual signal.

In the case of DCT transform coding and vertical prediction, the only AC coefficients that are likely to exhibit sufficiently high correlation to merit prediction analysis are those in the same row as the DC coefficient (shaded in block C). For each AC coefficient of block X in the same row as the DC coefficient($AC_X(1,0)$ to $AC_X(n,0)$), the AC coefficient predictor 330 generates a prediction corresponding to the colocated AC coefficient of block C ($AC_C(1,0)$ to $AC_C(n,0)$). The predicted AC coefficient is subtracted from the actual AC coefficient of block X at the subtractor 340 to obtain an AC prediction residual signal. The AC coefficient predictor is toggled between a horizontal prediction mode and a vertical prediction mode by the hor/vert signal 320. Gradient prediction of AC coefficients other than those described above need not be performed.

While correlation of AC coefficients between blocks may occur, it does not occur always. Accordingly, prediction of AC coefficients does not always lead to bandwidth efficiencies. Accordingly, in a preferred embodiment, the prediction circuit 140 permits selection of modes of operation between a mode wherein AC coefficient prediction is performed and a second mode wherein AC coefficient prediction is not performed. In this latter case, AC coefficients from the transform circuit pass through the prediction circuit without change.

Once the residuals are known, an AC prediction analyzer 350 compares the bandwidth that would be consumed by transmitting the AC residual signals of the macroblock with the bandwidth that would be consumed by transmitting the AC coefficients of the macroblock without prediction. The prediction analyzer 350 selects the transmission mode that consumes relatively less bandwidth. The prediction analyzer 350 generates an AC prediction flag signal 360 to indicate its selection.

Prediction is performed based on "like kind" blocks. When identifying blocks for prediction of a block of luminance data, only adjacent blocks of luminance data are considered. Any intervening blocks of chrominance data are ignored for prediction purposes. When predicting coefficients of the chrominance blocks, only like kind chrominance signals are considered for prediction. When predicting data for a block of $C_r$ data, one type of chrominance signal, adjacent blocks of $C_r$ data are considered but intervening blocks of luminance and second type chrominance signal $C_b$ data are ignored. Similarly, when predicting data for a block of $C_b$ data, a second type of chrominance signal, adjacent blocks of $C_b$ data are considered but intervening blocks of luminance and $C_r$ data are ignored.

The prediction circuit 150 may output a DC residual signal, signals representing either AC coefficients or AC residuals and an AC prediction flag signal.

Figure 4:
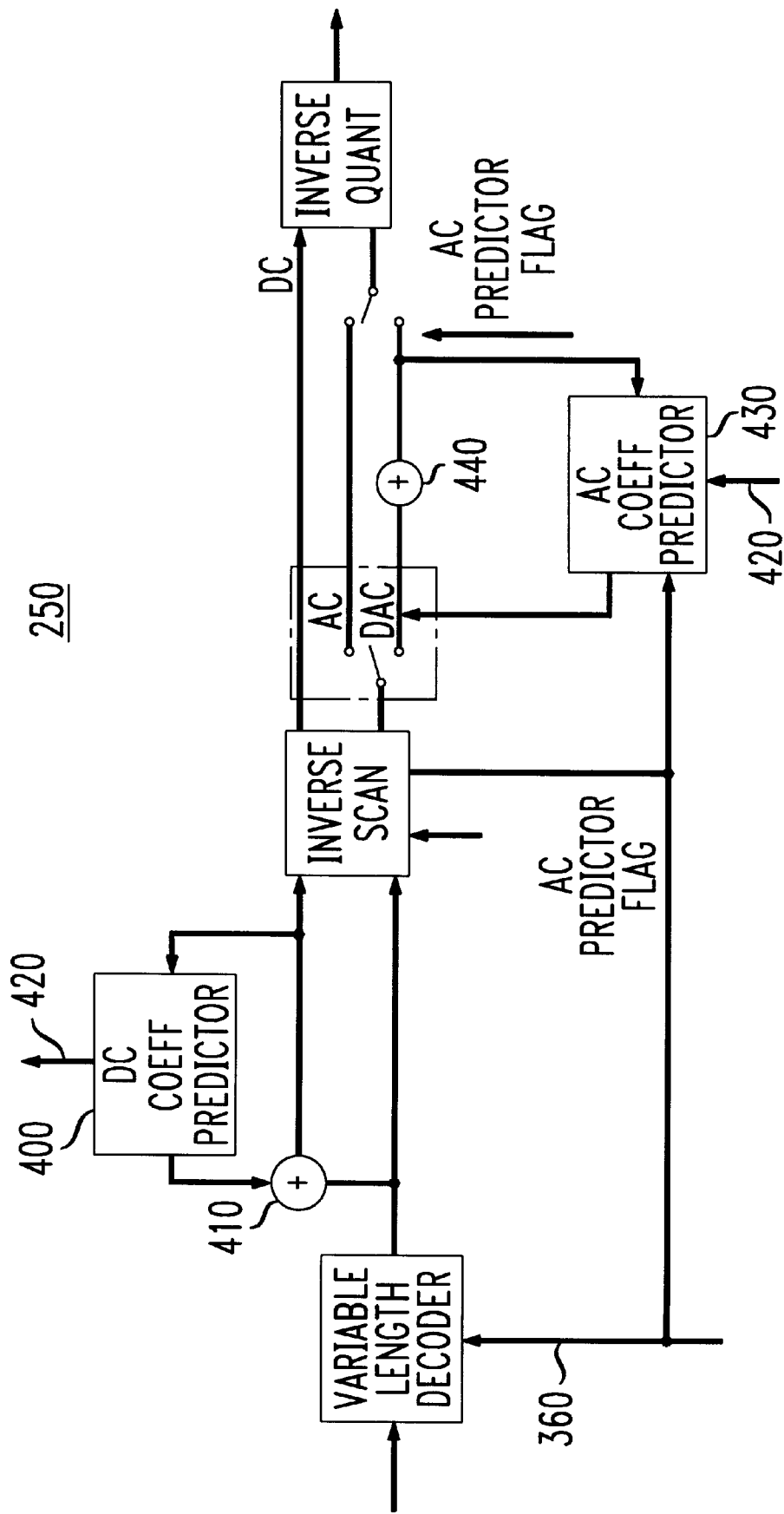
FIG. 4 is a block diagram of the reconstruction circuit of FIG. 1.

An inverse prediction operation is performed in the reconstruction circuit 250, shown in FIG. 4. For every block X, a DC coefficient predictor 400 maintains in memory data of an adjacent block A prior to block X, data of an adjacent block C above block X and data of a block B prior to block C, the block above block X. The DC coefficient predictor 400 compares a DC coefficient of block A with a DC coefficient of block B to determine the vertical gradient. Further, the DC coefficient predictor 400 compares a DC coefficient of block C with the DC coefficient of block B to determine the horizontal gradient. If the horizontal gradient is greater than the vertical gradient, the DC coefficient predictor 400 generates the DC coefficient of block C as a basis for prediction. Otherwise, the DC coefficient predictor 400 generates the DC coefficient of block A. The DC coefficient predictor 400 also generates a hor/vert signal 420 identifying whether horizontal or vertical prediction is used.

The reconstruction circuit 250 identifies the DC residual signal from the input bitstream. An adder 410 adds the DC residual to the DC coefficient generated by the DC coefficient predictor 400. The adder 410 outputs the DC coefficient of block X.

In a preferred embodiment, the reconstruction circuit 250 identifies the AC prediction flag 360 from the input bitstream. If the AC prediction flag 360 indicates that AC prediction was used, the reconstruction circuit identifies the AC residual signals from the input bitstream and engages an AC coefficient predictor 430. A hor/vert signal 420 from the DC coefficient predictor identified whether block A or block C is used as a basis for prediction. In response, the AC coefficient predictor 430 generates signals corresponding to the AC coefficients of block A or block C in the same manner as the AC coefficient predictor 330 of the predictor 140. An adder 440 adds predicted AC coefficients to corresponding residuals and outputs reconstructed AC coefficients.

If the AC prediction flag indicates that AC prediction was not used, the reconstruction circuit 250 identifies the AC coefficient signals from the bitstream. No arithmetic operations are necessary to reconstruct the AC coefficients.

Refinements of the DC prediction may be achieved in a preferred embodiment by inducing contribution of some of the perceptually significant AC coefficients from the block of prediction to the DC coefficient of block X. For example, where block A is used as a basis of prediction, the predicted DC coefficient of block X may be set as:

$$DC_X = DC_A + (4Q_p/3) * (AC_{02A} - AC_{01A}/4)$$

where $Q_p$ is the scaling factor of the quantities and $AC_{02A}$ and $AC_{01A}$ are AC coefficients of block A generated by a DCT transform.

Similarly, when block C is used as a basis for prediction, the predicted DC coefficient of block X may be set as:

$$DC_X = DC_C + (4Q_p/3) * (AC_{20C} - AC_{10C}/4)$$

where $Q_p$ is the scaling factor of the quantities and $AC_{20C}$ and $AC_{10C}$ are AC coefficients of block C generated by a DCT transform.

The prediction and reconstruction process described herein is termed an "implicit" method because no overhead signals are required to identify which of the blocks are used for prediction. In operation, coefficient values of blocks A, B and C are known at both the encoder 100 and the decoder 200. Thus, the decoder 200 can reconstruct the prediction operation of the encoder 100 without additional signaling. In an embodiment where the prediction circuit did not select between modes of AC prediction, the AC prediction and reconstruction is purely implicit. With the addition of an AC prediction flag in a second embodiment, the prediction process is no longer purely implicit.

The encoding/decoding operation of the prediction and reconstruction circuit may also be performed in software by a programmed micro processor or digital signal processor.

Figure 5:
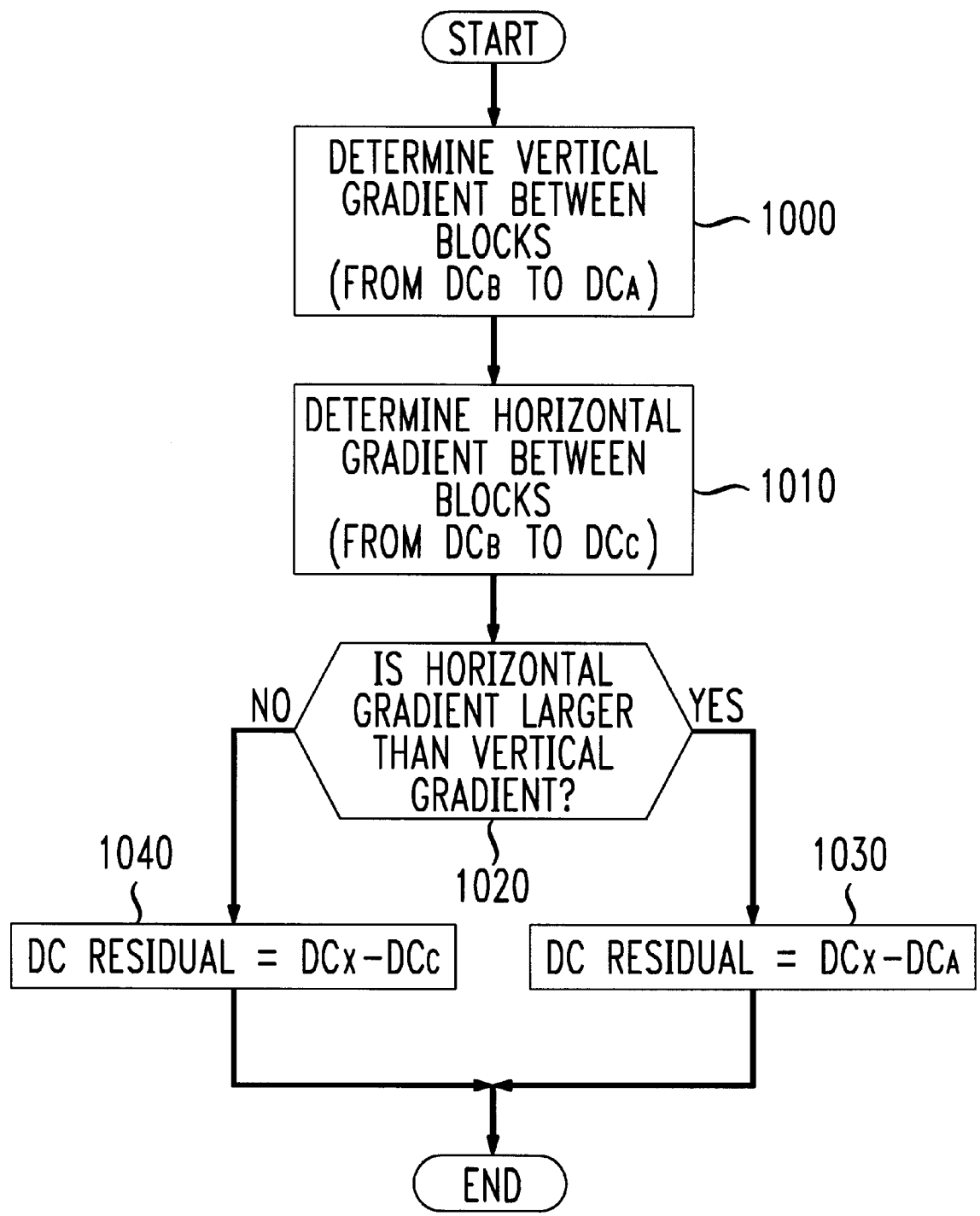
FIG. 5 is a flow diagram of a prediction circuit implemented in software.

FIG. 5 illustrates the operation of the software implemented prediction circuit. The processor compares the DC coefficient of block A to the DC coefficient of block B to determine the vertical gradient (Step 1000). The processor also compares the DC coefficient of block C to the DC coefficient of block B to determine the horizontal gradient (Step 1010).

The processor determines whether the vertical gradient is larger than the horizontal gradient. (Step 1020). If so, the processor defines the DC residual of block X to be the actual DC coefficient of block X less the DC coefficient of block A (Step 1030). If not, the processor defines the DC residual of block X to be the actual DC coefficient of block X less the DC coefficient of block C (Step 1040).

Figure 6:
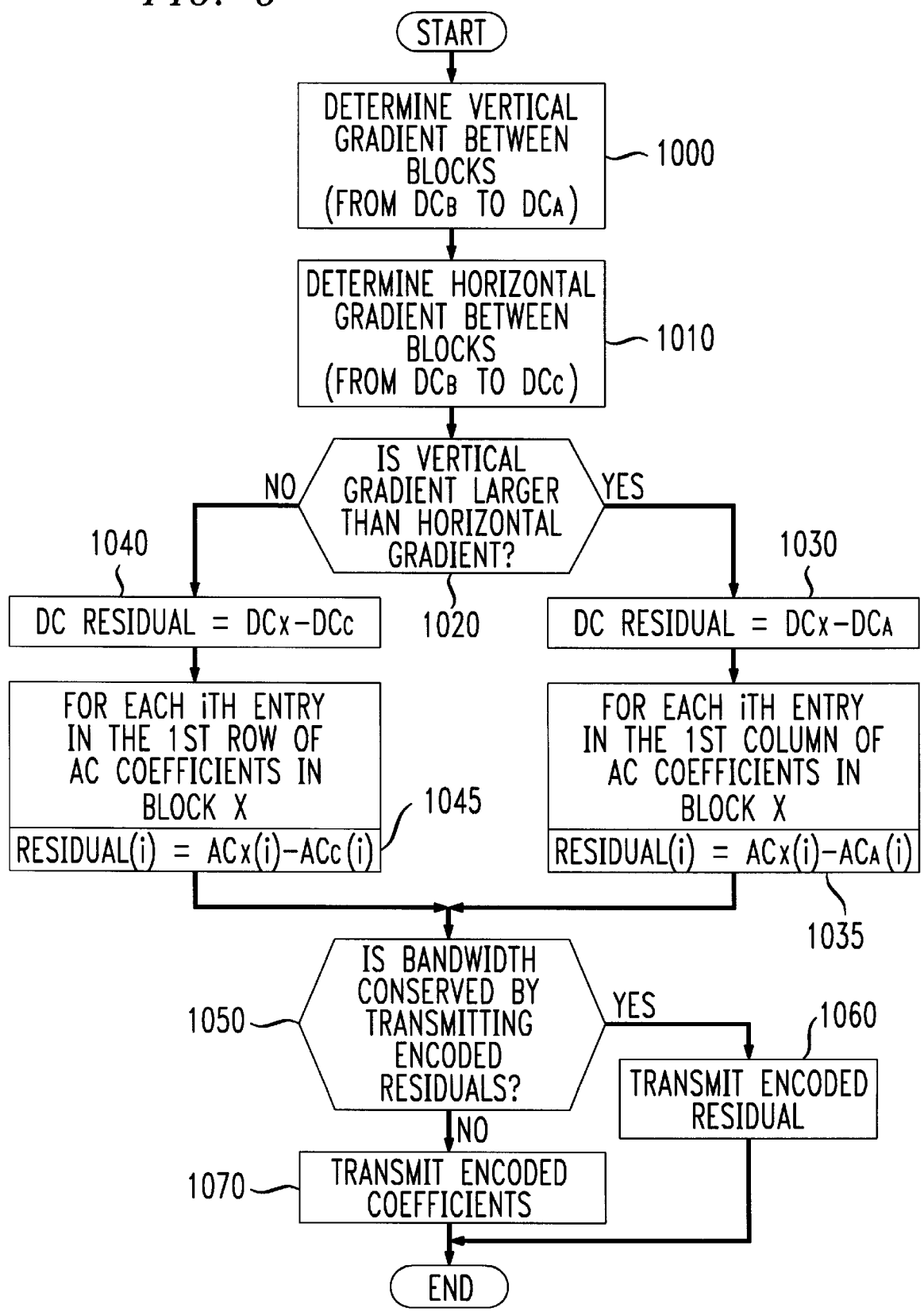
FIG. 6 is a flow diagram of a second embodiment of a prediction circuit implemented in software.

In the event the processor also performs AC prediction, the processor operates as shown in FIG. 6. Steps 1000–1040 occur as discussed above with respect to FIG. 5. When the vertical gradient is larger than the horizontal gradient, the AC coefficients from block A that are in the same column as the DC coefficient are used as a basis for predicting the corresponding AC coefficients of block X. Accordingly, for each such AC coefficient $AC_X(0,1)$ through $AC_X(0,n)$, block X, the processor computes an AC residual set to the actual AC coefficient in block X less the corresponding AC coefficient in block A ($AC_A(0,1)$ through $AC_A(0,n)$) (Step 1035).

When block C is used as a basis of prediction, the AC coefficients in the same row of the DC coefficients may exhibit correlation between blocks. Accordingly, for each AC coefficient AC(i) in the row of block X, the processor computes a residual (i) set to the actual AC coefficient in block X less the corresponding AC coefficient in block C (Step 1045).

The processor also determines whether bandwidth savings are achieved by predicting the AC coefficients. Once all prediction is done for a macroblock, the processor determines whether less bandwidth is occupied by the encoded coefficients or the residuals (Step 1050). If the residuals occupy less bandwidth, the processor outputs the residuals (Step 1060). Otherwise, the processor outputs the coefficients (Step 1070).

Figure 7A:
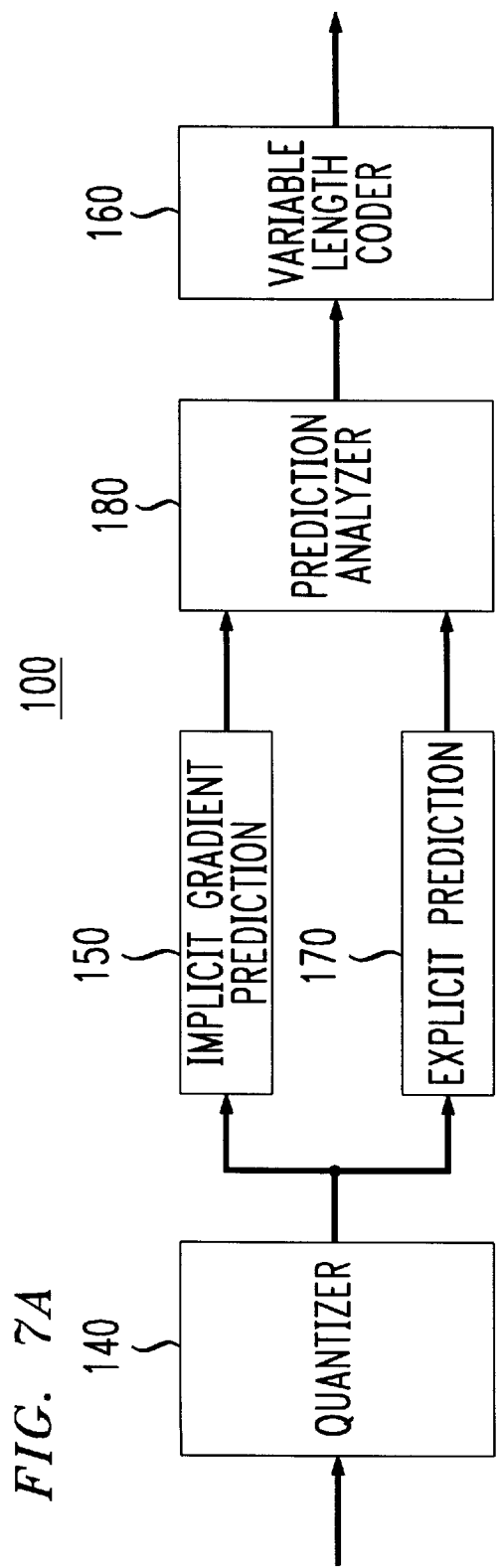
FIG. 7(a) is a schematic drawing of an encoder in accordance with a second embodiment of the present invention.

The gradient prediction method of the present invention provides significant advantages in that it provides automatic adaptivity to scene contents. However, the gradient prediction method is sometimes over responsive when coding flat areas with low detail or when coding very large, very uniform areas with only a few local variations. Other known coding schemes may provide better performance on these occasions than the gradient prediction method. Accordingly, in a preferred embodiment, the prediction circuit of the present invention is used in tandem with other known prediction circuits, shown in FIG. 7(a). Each of the prediction circuits receives scaled coefficients from the quantizer 140 and performs their respective prediction analyses. A prediction analyzer 180 selects the one of the prediction circuits that yields the best compression performance.

In one preferred embodiment, an explicit prediction circuit 170 is provided in parallel with the gradient prediction circuit 150. The explicit prediction circuit employs a prediction scheme, such as the known "Annex I" technique, that provides overhead information in addition to a prediction signal identifying a specific prediction direction. The Annex I technique is described in a paper entitled "Intra Prediction (T9/T10) and DC/AC Prediction Results," authored by T. K. Tan and S. M. Shen (July, 1996). Both the gradient prediction circuit 150 and the explicit prediction circuit 170 output prediction signals to a prediction analyzer 180. The prediction analyzer 180 selects the prediction circuit that yields the greatest overall compression. In the case of the explicit prediction circuit 170, however, the prediction analyzer 180 considers both the prediction signal and the overhead signal in its efficiency computation. The prediction analyzer 180 also generates a signal identifying which of the prediction techniques was used.

Figure 7B:
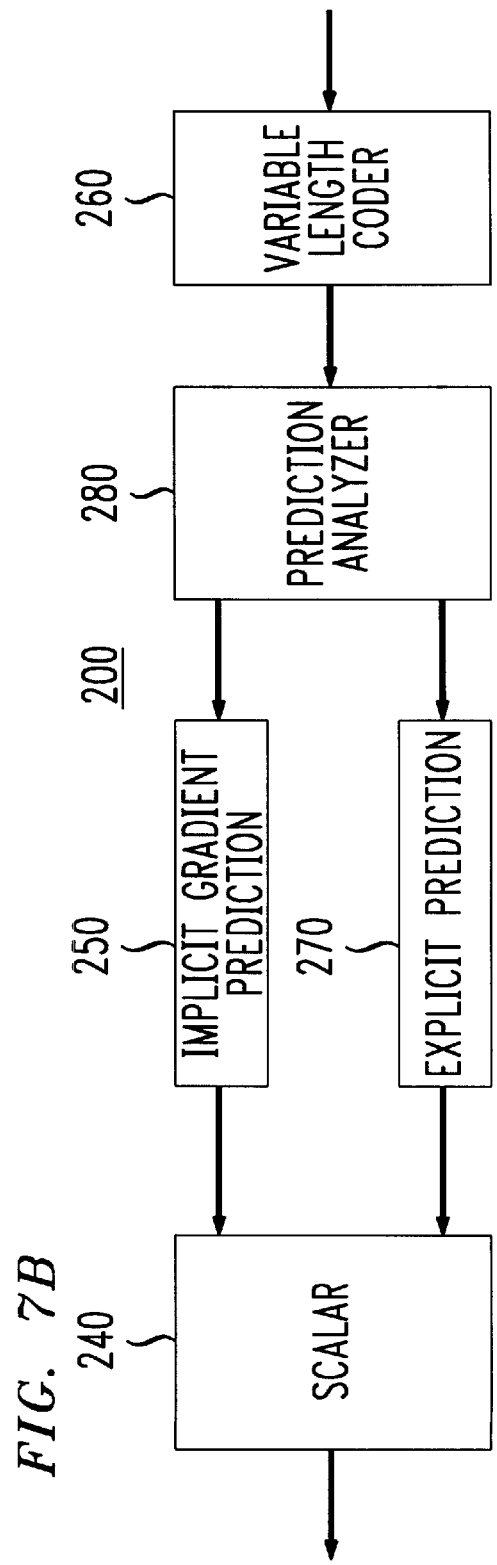
FIG. 7(b) is a schematic drawing of a decoder in accordance with a second embodiment of the present invention.

In this embodiment, the decoder 200 also possesses an explicit prediction circuit 270 in parallel with the gradient prediction circuit 250, shown in FIG. 7(b). A prediction analyzer 280 receives a decoded bitstream from the variable length coder 260. The prediction analyzer 280 determines from the identifying signal generated by the prediction analyzer 180 whether gradient prediction or explicit prediction was used at the encoder 100. Based upon that determination, the prediction analyzer 280 forwards the residual coefficient information to either the gradient predictor 250 or the explicit predictor 270. When the coefficient information is provided to the gradient predictor 250, the gradient predictor 250 performs the inverse operation applied by the gradient predictor 150 of the encoder. The gradient predictor 250 then forwards coefficient information to the scaler circuit 240. When the prediction circuit provides the prediction information to the explicit predictor 270, the explicit predictor 270 performs an inverse operation of the explicit predictor 170 of the encoder 100. The explicit predictor then provides coefficient information to the scaler circuit 240 for further processing.

The present invention provides a bandwidth efficient scheme for video coding that provides adaptivity to changing video contents. In image areas having significant texture or other gradients, the gradient prediction mode may prove to be particularly efficient. However, for flat image areas, the coder may enter the explicit prediction mode because it may prove to possess a coding advantage in these areas. Thus, the coder possess two modes of operation that complement each other. At the time of this writing, the complementary coding scheme is adopted into the MPEG-4 Video Verification Model and is being considered for the MPEG-4 video standard.

We claim:

1. A video coder for coding coefficients representing blocks of video information, comprising, a gradient prediction circuit that generates first prediction signals from the coefficients, the gradient prediction circuit comprising:

horizontal gradient estimator that determines a horizontal gradient of coefficients from a first block above and adjacent to the given block to a second block above the given block, vertical gradient estimator that determines a vertical gradient from the first block to a third block below the first block, and gradient predictor that codes the coefficients of the given block with reference to one of the second or third blocks as determined by the relative magnitudes of the horizontal and vertical gradients, a second prediction circuit that generates second prediction signals from the coefficients according to a second prediction scheme, and a prediction analyzer coupled to the gradient prediction circuit and the second prediction circuit and selecting one of said prediction circuits based on relative efficiencies between them.

2. The coder of claim 1, wherein the second prediction circuit employs an explicit prediction circuit.

3. The coder of claim 1, wherein the second prediction signals include an overhead signal identifying a mode of operation of the prediction circuit and predicted video signals representative of the video information.

4. The coder of claim 1, wherein the second prediction circuit employs Annex I prediction.

5. The coder of claim 1, the prediction analyzer generates a selection signal identifying which of the gradient prediction circuit and the second prediction circuit is selected.

6. A video decoder, for decoding coded blocks of video information, comprising
   a gradient prediction circuit that reconstructs coefficients of a given block, comprising:
      horizontal gradient estimator that determines a horizontal gradient of coefficients from a first block of reconstructed coefficients above and adjacent to the given block to a second block of reconstructed coefficients above the given block,
      vertical gradient estimator that determines a vertical gradient from the first block to a third block below the first block, and
      gradient predictor that decodes the coefficients of the given block with reference to reconstructed coefficients of one of the second or third blocks as determined by the relative magnitudes of the horizontal and vertical gradients,
   a second prediction circuit for reconstruction of scaled coefficients from second prediction signals,
   a prediction analyzer for identifying one of the gradient prediction signals or second prediction signals in the coded video information and selecting one of the gradient prediction circuit or the second prediction circuit response to the identification.

7. The video decoder of claim 6, wherein the prediction analyzer identifies prediction signals in the coded video information by identifying a selection signal in the coded video information representing the type of prediction signals in the coded video information.

8. The decoder of claim 6, wherein the second prediction circuit employs an explicit prediction scheme.

9. The decoder of claim 6, wherein the second prediction circuit employs an Annex I prediction scheme.

10. A method of coding blocks of coefficients representing video information, comprising steps of:
   performing gradient prediction on the coefficients according to, for a given block:
      determining a horizontal gradient of coefficients from a first block above and adjacent to the given block to a second block above the given block,
      determining a vertical gradient from the first block to a third block below the first block, and
      coding gradient prediction signals of the coefficients of the given block with reference to one of the second or third blocks as determined by the relative magnitudes of the horizontal and vertical gradients,
   performing a second prediction on the block to obtain second prediction signals representative of the coefficients of that block, and
   outputting either the gradient prediction signals or the second prediction signals based on relative efficiencies of the gradient prediction and the second prediction.

11. The coding method of claim 10, wherein the second prediction comprises an explicit prediction.

12. The coding method of claim 10, wherein the second prediction signals include an overhead signal identifying a mode of operation of the second prediction and predicted video signals representative of the video information.

13. The coding method of claim 10, wherein the second prediction employs Annex I prediction.

14. The coding method of claim 10, further comprising a step of generating a selection signal identifying which of the gradient prediction signals and the second prediction signals are coded.

15. A method of decoding coded video information, the coded video information containing one of gradient prediction signals and second prediction signals associated with a block of video data, comprising the steps of:
   identifying a type of prediction signals contained in the coded video information,
   when the prediction signals are gradient prediction signals, reconstructing video information according to the method of:
      determining a horizontal gradient of coefficients from a first block of reconstructed coefficients above and adjacent to the given block to a second block of reconstructed coefficients above the given block,
      determining a vertical gradient from the first block to a third block below the first block, and
      decoding the gradient prediction signals with reference to reconstructed coefficients of one of the second or third blocks as determined by the relative magnitudes of the horizontal and vertical gradients, and
   when the prediction signals are second prediction signals, reconstructing video information from the second prediction signals.

16. The decoding method of claim 15, wherein the identifying step includes a step of identifying a selection signal in the coded video information representing the type of prediction signals contained in the coded video information.

17. The decoding method of claim 15, wherein the step of reconstructing from second prediction signals includes reconstruction according to explicit prediction.

18. The decoding method of claim 17, wherein the second prediction signals include overhead signals identifying a mode of operation of the explicit prediction.

19. The decoding method of claim 15, wherein the step of reconstructing from second prediction signals includes reconstruction according to Annex I prediction.

20. A bitstream representing video information created according to the method of:
   receiving coefficients representative of a given block of video information,
   performing gradient prediction on the coefficients to obtain gradient prediction signals representative of the coefficients, the gradient prediction performed according to the method of:
      determining a horizontal gradient of coefficients from a first block above and adjacent to the given block to a second block above the given block,
      determining a vertical gradient from the first block to a third block below the first block, and
      coding gradient prediction signals representative of the coefficients of the given block with reference to one of the second or third blocks as determined by the relative magnitudes of the horizontal and vertical gradients,
   performing a second prediction on the coefficients to obtain second prediction signals representative of the coefficients, and
   outputting digital data representing either the gradient prediction signals or the second prediction signals based on relative efficiencies of the gradient prediction and the second prediction.

* * * * *